United States Patent
Barois et al.

(10) Patent No.: US 11,870,505 B2
(45) Date of Patent: Jan. 9, 2024

(54) METHOD AND DEVICE FOR TRANSMITTING A MESSAGE

(71) Applicant: SAGEMCOM ENERGY & TELECOM SAS, Rueil Malmaison (FR)

(72) Inventors: Jérôme Barois, Rueil Malmaison (FR); Julien Barthes, Rueil Malmaison (FR); Clément Terrien, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 158 days.

(21) Appl. No.: 17/358,951

(22) Filed: Jun. 25, 2021

(65) Prior Publication Data
US 2022/0006487 A1    Jan. 6, 2022

(30) Foreign Application Priority Data
Jul. 1, 2020    (FR) .................................... 2006933

(51) Int. Cl.
*H04B 3/54*    (2006.01)

(52) U.S. Cl.
CPC .................................... *H04B 3/54* (2013.01)

(58) Field of Classification Search
CPC .. H04B 2203/5408; H04B 3/54; H04B 10/50; H04B 10/516; H04B 10/60
See application file for complete search history.

(56) References Cited

U.S. PATENT DOCUMENTS

| | | | | |
|---|---|---|---|---|
| 2010/0316140 A1* | 12/2010 | Razazian | ............... | H04B 3/542 375/295 |
| 2012/0189042 A1 | 7/2012 | Varadarajan et al. | | |
| 2013/0215885 A1* | 8/2013 | Vijayasankar | ........ | H04L 1/0065 375/257 |
| 2014/0126655 A1* | 5/2014 | Vijayasankar | ........... | H04B 3/54 370/254 |
| 2015/0071306 A1* | 3/2015 | Lin | ..................... | H04L 27/2627 370/468 |
| 2016/0127515 A1 | 5/2016 | Kim et al. | | |

OTHER PUBLICATIONS

Feb. 8, 2021 Search Report issued in French Patent Application No. 2006933.

* cited by examiner

*Primary Examiner* — David S Huang
(74) *Attorney, Agent, or Firm* — Williams Mullen; R. Brian Drozd

(57) ABSTRACT

A message-transmission method for transmitting a message from a first node device to a second node device belonging to a network neighbourhood of said first node device is described. The first and second node devices belong to an electrical supply network using powerline and/or radio-frequency communications. The first node device transmits said message to said second node device on a first frequency band and at least one second frequency band of a set of frequency bands comprising at least two frequency bands. The message being on each occasion modulated according to a robust mode, a modulation according to said robust mode comprising successively a Reed-Solomon coding, a convolutional coding, a code repetition coding and a BPSK modulation.

7 Claims, 3 Drawing Sheets

METHOD AND DEVICE FOR TRANSMITTING A MESSAGE

TECHNICAL FIELD

At least one embodiment relates to a transmission method for transmitting a message from a first node device to a second node device belonging to a network neighbourhood of the first node device, said first and second node devices belonging to an electrical supply network using powerline communications. At least one embodiment relates to a device implementing the method.

PRIOR ART

Powerline communications (PLC) are developing, in particular in the context of electrical supply networks of the AMM (abbreviation signifying "Automated Meter Management") type. Communication networks are thus implemented in electrical supply networks for the automated collection, by a base node device (also called a "data concentrator") of the network, from smart electricity meters, of energy consumption reading data that said smart electricity meters are respectively responsible for monitoring.

The G3-PLC communication standard is defined to enable the various node devices (in particular the data concentrator and smart electricity meters) of such a network to communicate with each other. The standard is specified in the ITU-T recommendation G.9903, which describes in particular the physical layer (PHY) and the data link layer (DLL) of the OSI ("Open Systems Interconnection") model. The G3-PLC standard is intended to be used in frequency bands ranging from 10 to 490 kHz. It supports more particularly the following frequency bands: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; and the CENELEC B frequency band, which goes approximately from 98 kHz to 122 kHz. These various frequency bands have different characteristics in terms of bit rate, range and resistance to interference, in particular.

However, the G3-PLC standard allows the use of only one frequency band for a given node device. More exactly, recent node devices may sometimes support a plurality of frequency bands, but not at the same time. Reconfiguration is then necessary to change from a first frequency band to a second frequency band. Thus, when in a communication network it is necessary to reconfigure, in a new frequency band, a set of data concentrator devices and a set of electricity meters that are associated therewith, a reconfiguration may prove to be particularly complex. For example, a meter device that has not been able to receive a message indicating to it to change frequency band may become incapable of communicating with the data concentrator device with which it is associated, after the latter, for its part, has been able to change frequency band. In a later version of the G3-PLC standard, an RF (the acronym for radio frequency) channel may be used in place of one of said PLC frequency bands. In the remainder of the document, the words "frequency band" designate indifferently a PLC frequency band or an RF channel.

However, powerline channels or radio-frequency channels are very hostile supports. The frequency band for which the elements constituting a network have been certified may therefore have a great deal of interference. The exchanges in the network are then no longer provided correctly.

It is desirable to overcome these various drawbacks of the prior art. It is in particular desirable to propose a powerline communication method making it possible to improve the exchanges in the network, in particular in the case of strong interference, which is simple to implement.

DISCLOSURE OF THE INVENTION

A message transmission method for transmitting a message from a first node device to a second node device belonging to a network neighbourhood of said first node device is described. The first and second node devices belong to an electrical supply network using powerline and/or radio-frequency communications. The transmission method in so-called hyper-robust mode comprises the following steps implemented by said first node device:
  transmitting said message, to said second node device, on a first frequency band of a set of frequency bands comprising at least two frequency bands, said message being modulated according to a robust mode, a modulation according to said robust mode comprising successively a Reed-Solomon coding, a convolutional coding, a coding by code repetition and a BPSK modulation; and
  transmitting said message, to said second node device, on at least one second frequency band of said set of frequency bands, said message being modulated according to said robust mode and said first and second frequency bands being different.

In this way, in the event of strong interference on a frequency band, the message may despite everything manage to pass over another frequency band. This is because the second node device needs to receive the message only on one of the frequency bands on which it has been transmitted. This transmission mode is therefore particularly advantageous in the case of strong interference.

In a particular embodiment, the frequency bands of said set of frequency bands are separate.

In a particular embodiment, the following steps are performed by said second node device:
  receiving said message on said first frequency band and on said second frequency band;
  deducing therefrom that the first node device is configured according to the hyper-robust transmission mode;
  changing its own transmission mode into hyper-robust mode in the case where its own transmission mode is different from said hyper-robust mode;
  transmitting, to said first node device, an acknowledgement message on said first frequency band and an acknowledgement message on said second frequency band.

In a particular embodiment, deducing therefrom that the first node device is configured according to the hyper-robust transmission mode comprises deducing therefrom that the first node device is configured according to the hyper-robust transmission mode when said second message is received before the end of a time window of predefined length commencing with the reception of said message on said first time band.

In a particular embodiment, said first node device, on receiving a message coming from said second node device on one of said first and second frequency bands, returns an acknowledgement message on said first frequency band and an acknowledgement message on said second frequency band, and said second node device, receiving an acknowledgement message on said two frequency bands, deduces therefrom that the first node device is configured according to the hyper-robust transmission mode and changes its own transmission mode into hyper-robust mode in the case where its own transmission mode is different from said hyper-robust mode.

In a particular embodiment, said first node device considers that said message has been correctly received by said second node device in the case where at least one acknowledgement message is received by said first device on at least one of said first and second frequency bands. For example, said first node device considers that said message has been correctly received by said second node device in the case where at least one of said acknowledgement messages transmitted by said second node device is received by said first node device.

In a particular embodiment, said set of frequency bands comprises:
the CENELEC A frequency band;
the CENELEC B frequency band;
the FCC frequency band or the ARIB frequency band; and
the RF channel of G3-PLC hybrid RF.

A node device of an electrical supply network using powerline and/or radio-frequency communications is described. The node device is configured for communicating in a so-called hyper-robust transmission mode with another node device of said network belonging to its network neighbourhood and comprises:
means for transmitting said message to said second node device on a first frequency band of a set of frequency bands comprising at least two frequency bands, said message being modulated according a robust mode, a modulation according to said robust mode comprising successively a Reed-Solomon coding, a convolutional coding, a coding by code repetition and a BPSK modulation; and
means for transmitting said message, to said second node device, on at least one second frequency band of said set of frequency bands, said message being modulated according to said robust mode and said first and second frequency bands being different.

A powerline and/or radio-frequency communication network is described. The network comprises a plurality of node devices, said plurality of node devices comprising at least one node device according to the previous embodiment, which comprises in the vicinity thereof at least one node device comprising:
means for receiving said message on said first frequency band and on said second frequency band;
means for deducing therefrom that the node device according to the preceding embodiment is configured according to the hyper-robust transmission mode;
means for changing its own transmission mode into hyper-robust transmission mode in the case where its own transmission mode is different from said hyper-robust transmission mode;
means for transmitting, to said node device according to the preceding embodiment, an acknowledgement message on said first frequency band and an acknowledgement message on said second frequency band.

A computer program product is described. It comprises instructions for implementing, by a node device, the method according to one of the preceding embodiments, when said program is executed by a processor of the node device.

A storage medium is also described. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
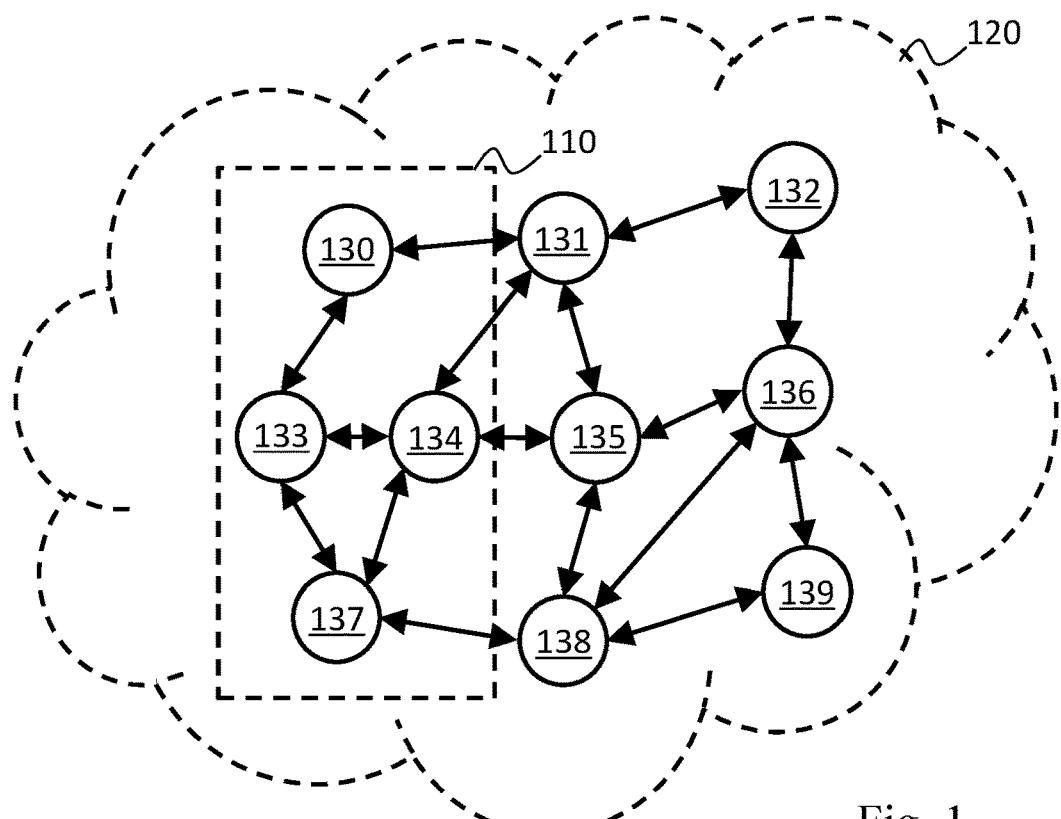
FIG. 1 illustrates schematically a mesh communication network according to one embodiment.

FIG. 1 illustrates schematically a mesh communication network 120. The mesh communication network 120 is for example an electrical supply network of the AMM type. The mesh communication network 120 relies on powerline communications PLC and/or radio-frequency communications to enable a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of the communications in the mesh communication network 120, as detailed hereinafter. Thus the same smart electricity meter has available potentially a plurality of paths for reaching the data concentrator, and vice-versa.

The present invention is thus particularly adapted to the context of the G3-PLC and G3-PLC hybrid RF (registered trade mark) technology.

The mesh communication network 120 thus comprises a plurality of node devices 130, 131, 132, 133, 134, 135, 136, 137, 138, 139. A network neighbourhood is associated with each node device of the mesh communication network 120. On FIG. 1, the node device 133 is associated with a network neighbourhood 110 encompassing the node devices 130, 134 and 137. In the mesh communication network 120, a signal or a message broadcast by a node device (such as the node device 133) is in general not visible at every point in the communication network. Each node device sending signals or messages then has a network neighbourhood, that is to say a subset of said mesh communication network 120 wherein every node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type that rely on a global knowledge of the network topology, the routing protocols of the reactive type rely on on-demand route discoveries, each node device of the network then needing solely to have knowledge of its own network neighbourhood for routing data in the mesh communication network 120.

To discover a suitable route in the mesh communication network 120 from a source node device (for example the node device 133) as far as a destination node device (for example the node device 132), it is known that the source node device broadcasts a route discovery request, called RREQ ("Route REQuest"). This route discovery request is received by each node device in the network neighbourhood of said source node device. Each node device in the network neighbourhood of said source node device relays said request by broadcast if said node device in question is not the destination node device. By gradual broadcasting, a plurality of route discovery requests are typically received by the destination node device, each of these requests having followed a different path in the mesh communication network 120.

Each node device that originates a message, such as for example a route discovery request, includes therein an identifier that is particular to it, as well as a sequence number, as defined in the LOADng protocol. This sequence number is a counter value particular to each node device of the mesh communication network 120. Each time a node device generates a new message, said node device increments its counter and includes the value of said counter in the message in question. Thus, when a node device receives a message, said node device analyses the identifier of the node device originating the message and the sequence number that are included in the message, and can determine whether the message received is actually a new message or a new copy of a message already received.

Each node device can however decide not to relay a route discovery request, when one or more criteria are not met. In particular, before deciding to relay said request, the node device in question typically checks whether said request comprises information representing a route cost, from the source node device as far as the node device in question, that is better than the route cost represented by information contained in another route discovery request previously received by the node device in question. In other words, the node device in question relays said request by broadcasting if said request relates to a path that has followed, from the source node device as far as the node device in question, a pathway of lower cost than any other request previously received by the node device in question (and therefore for the same route discovery).

The cost of a route may be based on one or more metrics. For example, the route cost is a number of hops experienced by the request in question from the source node device. According to another example, the route cost is the result of a calculation that depends on the bandwidth of the links passed over, by the request in question, from the source node device. According to yet another example, the route cost is proportional to the latency experienced by the request in question from the source node device. Other metrics may be used to establish a route cost, i.e. a transit cost, from the source node device as far as the destination node device.

When a node device decides to relay, by broadcast, a route discovery request, the node device in question updates the route cost information contained in said request, so as to take into account the fact that said request has passed through the node device in question. Thus, according to such a principle, a plurality of route discovery requests typically arrive at the destination node device, each comprising information on the cost of the route that said request followed to be propagated from the source node device as far as the destination node device. The path followed by said route discovery request associated with the best route cost is then selected to enable the source node device to transmit data to the destination node device. To activate the route in question, the destination node device transmits a route discovery reply called RREP ("Route REPly"). This route discovery reply is transmitted gradually following the reverse path of the route discovery request that was associated with the best route cost. Each node device receiving the route discovery reply updates an internal routing table, at the data link layer DLL, in order to indicate therein that any subsequent message transmitted in unicast mode from the source node device in question to the destination node device in question must be transmitted or relayed to such and such a node device of its network neighbourhood. In the link layer, also called the MAC ("Medium Access Control") layer, the routing tables are preferentially implemented in an adaptation sublayer responsible for implementing the routing protocol in the communication network. For example, this adaptation sublayer is in accordance with the 6LoWPAN protocol (standing for "IPv6 over Low power Wireless Personal Area Networks), which was initially developed to support IPv6 in the context of the IEEE 802.15.4 standard and which was extended to the G3-PLC and G3-PLC hybrid RF (registered trade mark) technology. It should be noted that the 6LoW-PAN protocol is itself based on the routing protocol of the aforementioned LOADng reactive type.

By means of the routing tables thus configured, unicast communications can be made by any pair of node devices of the mesh communication network 120. Such intermediate node devices therefore serve as relays when the node devices of said pair are not in the network neighbourhood of each other, and the communications thus take place gradually, each node device relying on one of its own neighbours to relay messages as far as their respective destinations.

To communicate between adjacent node devices (i.e. node devices that are in the network neighbourhood of each other), the messages are transmitted in the form of modulated frames. When a modulated frame is specifically addressed to an adjacent node device and is correctly demodulated by it, said adjacent node device retransmits an acknowledgement ACK to the node device that sent it said modulated frame. The acknowledgement ACK is transmitted on the same frequency band as the modulated frame with which said acknowledgement ACK is associated.

A plurality of frequency bands are defined for supporting the transmission of these modulated frames, an adapted modulation scheme being associated with each of these frequency bands. Each frame transmitted in the form of modulated signals begins with a preamble predefined according to the modulation scheme according to which said signals were modulated. The preamble is adapted to make it possible to synchronise in reception on said frame, i.e. to be able to determine an actual instant of start of frame. To do this, the preamble typically comprises a plurality of successive copies of the same symbol. The actual content and the duration of the preamble are thus predefined and depend on the modulation scheme used. The preambles of a plurality of frames are identical when the same modulation scheme is applied, and different otherwise.

The modulation schemes applicable (and corresponding demodulation schemes) are preferentially multi-carrier modulation schemes (and respectively demodulation schemes) of the OFDM ("Orthogonal Frequency Division Multiplexing") type.

The powerline channels and the RF channel are very hostile supports. The characteristics and parameters of the channel vary according to the frequency, the location, the time and the type of equipment connected thereon. The low-frequency regions (from 10 kHz to 200 kHz) are particularly sensitive to interference. Apart from the background noise, the channel is subject to pulsed noises and to narrow-band interference. The OFDM technology used by G3-PLC uses advanced channel coding techniques. This combination allows very robust communication when narrow band interference, pulsed noises and frequency-selective attenuations are present.

For this purpose, an FEC (the acronym for "forward error correction") encoder is in particular used. This FEC encoder is composed of a Reed-Solomon encoder and a convolutional encoder that make it possible to introduce redundancy at the bit level. They thus enable a destination node to find the bits lost because of background noise and pulsed noises.

In the preferential context of the standard, G3-PLC defines several types of modulation are defined, among which: BPSK, DBPSK, QPSK, DQPSK, 8-PSK, DBPSK, 16-QAM and a so-called robust (or ROBO) mode. In normal mode, the FEC ("forward error correction") encoder is composed of a Reed-Solomon encoder and a convolutional encoder. In robust mode, the FEC ("forward error correction") encoder is composed of a Reed-Solomon encoder and a convolutional encoder as in normal mode. However, in the case of the robust mode, the convolutional encoder is followed by a repetition code. The repetition code repeats each bit output from the convolutional encoder three times. Thus the system is made more robust to the degradations of the channel at the cost of a reduction in the bit rate by 4. The data thus obtained are next passed to the input of an interleaver.

G3-PLC also defines a super-robust mode wherein the repetition code repeats each bit output from the convolutional encoder five times, which increases the robustness. This mode is used only for a part of the FCH (the acronym for "Frame Control Header") frame control of a data frame. The modulation in the robust and super-robust modes is a BPSK modulation.

In terms of frequency bands that can be used in the context of the implementation of the mesh communication network 120, mention can be made of: the CENELEC A frequency band, which goes approximately from 35 kHz to 91 kHz; the FCC frequency band, which goes approximately from 150 kHz to 480 kHz; the ARIB frequency band, which goes approximately from 150 kHz to 400 kHz; the CENELEC B frequency band, which goes approximately from 98 kHz to 122 kHz; and the RF channel of G3-PLC hybrid RF. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; a fourth sixteen carrier modulation scheme in the CENELEC B frequency band; and a fifth modulation scheme for the RF channel of G3-PLC hybrid RF. It appears from the above that a node device can simultaneously use a plurality of frequency bands for communicating with one or more of its neighbours, by applying an adapted transmission mechanism. However, it is clear that the ARIB and FCC frequency bands cannot be used simultaneously by the same node device since they overlap each other.

Thus, in a mesh communication network 120, the node devices or at least some of the node devices have multiband capacities. A node device has multiband capacities in the case where it is configured to be able to simultaneously use a plurality of different frequency bands, e.g. CENELEC-A and FCC or FCC and the RF channel of G3-PLC hybrid RF, instead of choosing a single band. For example, the node device in question can fragment a message into various fragments according to the 6LoWPAN protocol. The fragmentation method is more particularly described in section 5.3 of the RFC recommendation 4944 (published in September 2007). Each fragment is then transmitted independently of the other fragments on frequency bands that may be different. The associated frequency bands are for example selected from the set comprising the frequency bands authorised by G3-PLC, i.e. CENELEC A, CENELEC B, ARIB and FCC and the RF channel of G3-PLC hybrid RF. In a variant, the first and second associated frequency bands are selected from a subset of frequency bands authorised by G3-PLC and G3-PLC hybrid RF, the subset comprising at least two bands from all the bands authorised by G3-PLC and G3-PLC hybrid RF. This transmission mode is hereinafter referred to as multiband transmission by fragmentation. In the particular case where the message to be transmitted is sufficiently short, it is not fragmented.

In another embodiment, a node device having multiband capacities can transmit the same message simultaneously in all the frequency bands of the set of frequency bands adopted (by the sender and the receiver). This transmission mode is hereinafter referred to as the hyper-robust mode (or HROBO). In each frequency band, the robust mode of G3-PLC and G3-PLC hybrid RF is then used. In this transmission mode, the acknowledgement messages are also transmitted simultaneously in all the frequency bands of the set of frequency bands adopted. Duplicating the messages (including the acknowledgement messages) makes it possible to mitigate any interference. This is because, in the case of strong interference on a frequency band, the message may despite everything manage to pass over another frequency band. The receiver needs to succeed in capturing the message on only one of the frequency bands on which it was transmitted. This transmission mode is therefore particularly advantageous in the case of strong interference.

A device having multiband capacities can benefit from the characteristics of the various frequency bands in terms of bit rate, range, and resistance to interference.

In a particular embodiment, the frequency bands are not only different but more particularly separate.

According to one embodiment of the invention, a source node device configured to communicate in a plurality of frequency bands with a destination adjacent node device can, as required, determine which are the communication modes supported by this target adjacent node device, prior to sending more sizeable messages constituting communications.

In order to determine which are the communication modes supported by a destination adjacent node device (for example the node device 134), a source node device (for example the node device 133) transmits messages to the destination adjacent node device, in each of the frequency bands for which it is configured to communicate, said messages each comprising information aimed at seeking, from the target node device, a channel estimation in the frequency band used. The presence of the information aimed at seeking a channel estimation constitutes a channel estimation request. For example, in a network context compatible with the G3-PLC and G3-PLC hybrid RF (registered trade mark) standards, the information according to which a channel estimation is requested by a source node device to a destination adjacent node device is a message Tone Map Request defined in the ITU-T recommendation G9903, and the information representing at least one channel estimation, received from the target adjacent node device, is included in a message Tone Map Response as defined in section 9.3.5.2.2 of the G3-PLC standard (ITU G.9903 edition of March 2017). In an example embodiment, the message Tone Map Response comprises information such as the type of modulation that it uses for the frequency band in question and a Link Quality Indicator LQI.

The message Tone Map Response may contain other information as defined in the table section 9.9 of 9.3.5.2.2 of the ITU-T recommendation G9903 (version of March 2017), in particular a tone map. The tone map is a list of subcarriers used for communicating in a given frequency band. The source device can therefore know and store information with regard to the frequency bands that it can use for communicating with the adjacent node device.

According to one embodiment, the source node device records, e.g. in a neighbour table, the item or items of information representing a channel estimation for each frequency band for which it has received such information in response to a channel estimation request.

From the information received and recorded in a neighbour table, the node device 133 can, prior to subsequent communications with the node device 134, determine which are the communication modes supported by the latter. For example, the node device 133 detects that the adjacent node device 134 is a multi-band node device capable of communicating in the frequency bands B1 and B2 if it receives a Tone Map Response message on each of said frequency bands. In the case where the Tone Map Response messages indicate that the node device 134 is using a ROBO modulation and that the LQI is low, i.e. lower than a first given threshold value, then the node device 133 can decide to communicate with the node device 134 in HROBO mode. Symmetrically, in the case where the Tone Map Response messages received by the node device 134 indicate that the node device 133 is using a ROBO modulation and that the LQI is low, i.e. lower than the first given threshold value, then the node device 134 can also decide to communicate with the node device 133 in HROBO mode.

However, it may happen that the node devices 133 and 134 take different decisions with regard to the use of the HROBO mode. Thus, in another example, the node device 133 may decide to communicate with the node device 134 in HROBO mode, e.g. because it has received Tone Map Response messages on all the frequency bands indicating that the node device 134 is using a ROBO modulation and that the LQI is low. The node device 134 may for its part decide to operate in multiband by fragmentation mode using a ROBO modulation on each band, e.g. because it has received Tone Map Response messages on all the frequency bands indicating that the node device 133 is using a ROBO modulation and that the LQI is moderate, i.e. higher than the first threshold value but lower than a second threshold value different from the first threshold value. In the case where the node device 134 receives a Tone Map Response message on one of the frequency bands indicating that the node device 133 is using a ROBO modulation and that the LQI is low and receives a Tone Map Response message on the other one of the frequency bands, indicating that the node device 133 is using a ROBO modulation and that the LQI is moderate, it can also decide to operate in multiband by fragmentation mode using a ROBO modulation on each band.

Figure 2:
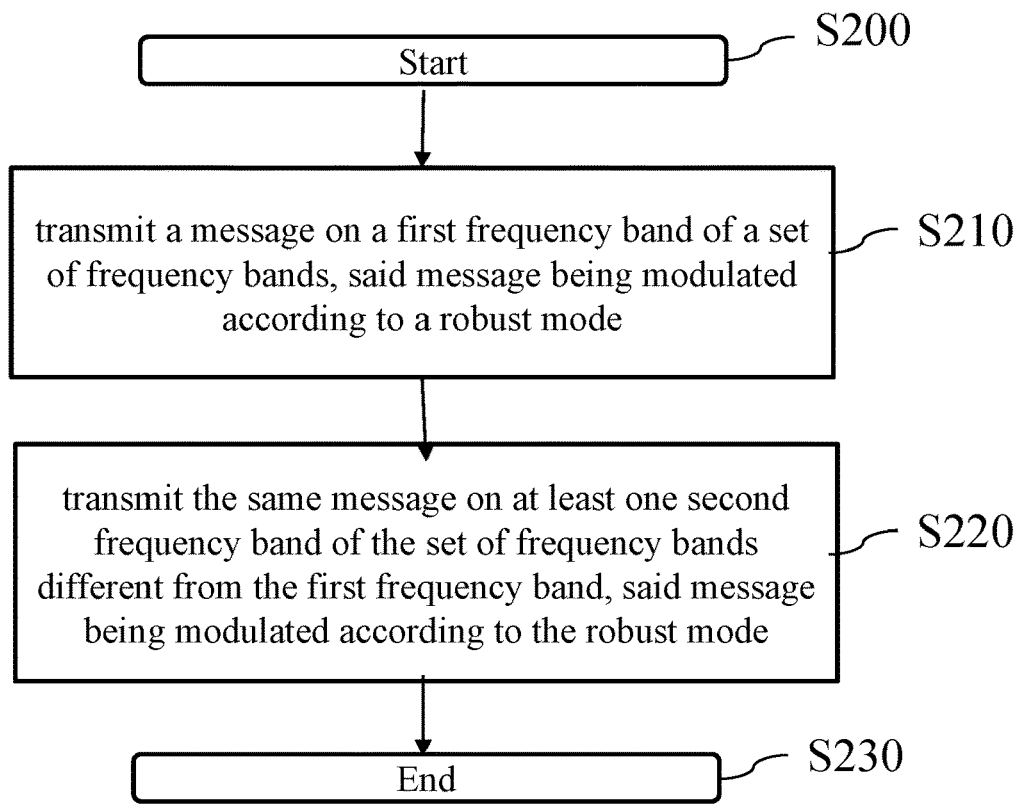
FIG. 2 illustrates schematically a method for transmitting a message or a frame in a hyper-robust mode according to a particular embodiment.

FIG. 2 illustrates schematically a method for transmitting a message or a frame in the HROBO mode according to a particular embodiment. The message M must be transmitted by a source node device (for example the node device 133) to a destination node device belonging to its network neighbourhood (for example the node device 134) according to the HROBO mode, In this embodiment, the two node devices have multi-band capacities and have decided to communicate in HROBO mode.

The method starts in a step S200.

In a step S210, the source node device transmits a message M to the destination node device on a first frequency band of a set of frequency bands comprising at least two frequency bands, said message being modulated according to the robust mode.

In a step S220, the source node device transmits to the destination node device the same message M on a second frequency band of the set of frequency bands, the message being modulated according to the robust mode. The second frequency band is different from the first frequency band.

The first and second frequency bands are for example selected from the set of frequency bands authorised by G3-PLC, i.e. CENELEC A, CENELEC B, and ARIB or FCC; and the RF channel of G3-PLC hybrid RF. In a variant, the first and second frequency bands are selected from a subset of frequency bands authorised by G3-PLC and G3-PLC hybrid RF, the subset comprising at least two frequency bands from all the frequency bands authorised by G3-PLC and G3-PLC hybrid RF.

The method terminates in a step S230.

The hyper-robust mode uses various frequency bands while transmitting the same message or frame simultaneously on these various frequency bands. In each frequency band the robust mode is used. Advantageously, the hyper-robust mode is used when the communication between the adjacent nodes is difficult, e.g. when a value of LQI for the link in question is lower than the first threshold value.

The source node device and a destination node device each based on the LQI values received in the tone map responses for selecting a transmission mode from the multiband mode (in ROBO mode in each band) or the hyper-robust mode may therefore take different decisions. In this case, one of the node devices must adapt its transmission mode in order to make it compatible with the one chosen by the other node. Thus it must be capable of changing from the multiband by fragmentation transmission mode with modulation of the ROBO type in each band to the hyper-robust mode if it detects that the other node device is communicating in hyper-robust mode.

Figure 3:
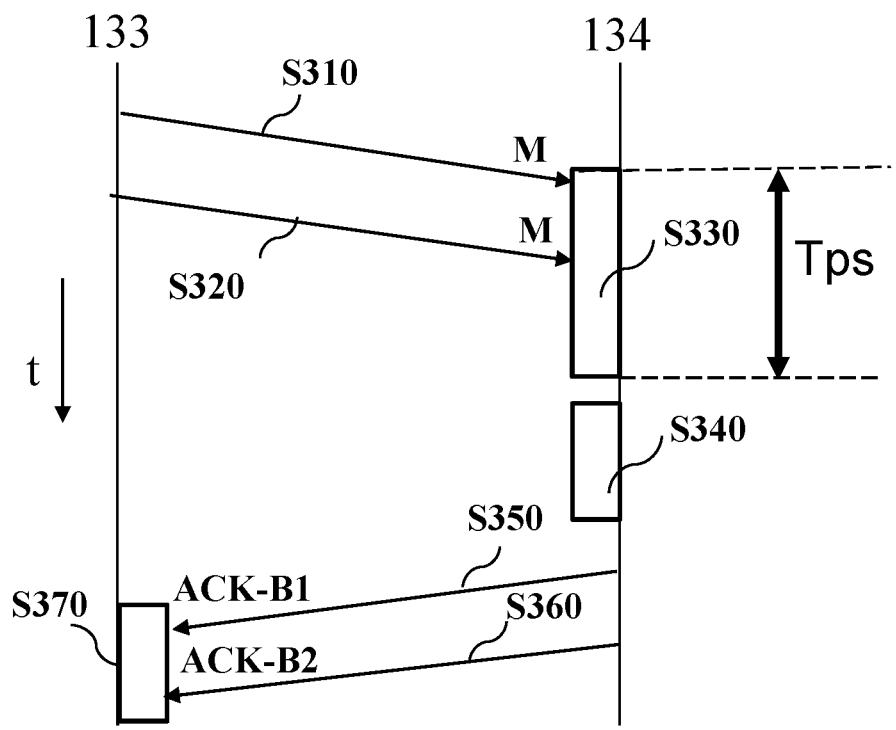
FIG. 3 illustrates schematically a method for transmitting a message or a frame in a hyper-robust mode according to another particular embodiment.

FIG. 3 illustrates schematically a method for transmitting a message or frame in the HROBO mode according to a particular embodiment. The message M is transmitted by a source node device (for example the node device 133) to a destination node device belonging to its network neighbourhood (for example the node device 134). In this embodiment, the two node devices have multiband capacities and one, e.g. the node device 133, has decided to communicate in HROBO mode whereas the other, e.g. the node device 134, has decided to communicate in multiband by fragmentation mode using a modulation of the ROBO type on each band. The node devices 133 and 134 are represented by vertical bars located respectively to left and right in FIG. 3 and the messages exchanged between the two devices are each represented by an arrow going from one to the other of the node devices 133 and 134, adjacent to each other. A reading from top to bottom of FIG. 3 corresponds to a chronological sequence of steps (here S310 to S370).

In a step S310, the node device 133 transmits a message M to the node device 134 on the first frequency band B1 in ROBO mode. This step is identical to the step S210 of FIG. 2.

In a step S320, the node device 133 transmits the same message M on the second frequency band B2 also in ROBO mode. This step is identical to the step S220 of FIG. 2.

In a step S330, the node device 134 receives the same message M on the two frequency bands in ROBO mode and deduces therefrom that the node device 133 is communicating in HROBO mode. According to a particular embodiment, the node device 134 provides, when the message M arrives on a first frequency band, e.g. the band B1 in the case of FIG. 3, a time window Tps during which it will be able to receive the same message M on another band, e.g. the band B2. The node device 134, if it receives the message M during the time window on the band B2, interprets this as an indication that the node device 133 is functioning in HROBO mode and not as a replay of the same message.

In a step S340, the node device 134, having detected that the node device 133 is communicating in HROBO mode, changes its multiband by fragmentation transmission mode into HROBO mode.

In a step S350, the node device 134 transmits an acknowledgement message ACK-B1 to the node device 133 on the first frequency band B1.

In a step S360, the node device 134 transmits an acknowledgement message ACK-B2 to the node device 133 on the second frequency band B2. More precisely, when the time window Tps expires, the node device 134 transmits an acknowledgement message on each of the frequency bands where it received the message M.

In a step S370, the node device 133 receives the acknowledgement messages ACK-B1 and ACK-B2. It may also happen that, in the step S370, the node device 133 receives only one of the two acknowledgement messages, i.e. either ACK-B1 or ACK-B2. This is because, the HROBO mode being used preferentially in disturbed environments, it is possible that only one of the two messages among ACK-B1 and ACK-B2 is received by the node device 133. The node device 133 will have to consider that it has received the acknowledgement even if it receives an acknowledgement message on only one of the frequency bands. Thus, even in this case, the node device 133 considers that the message M has indeed been received by the node device 134.

Figure 4:
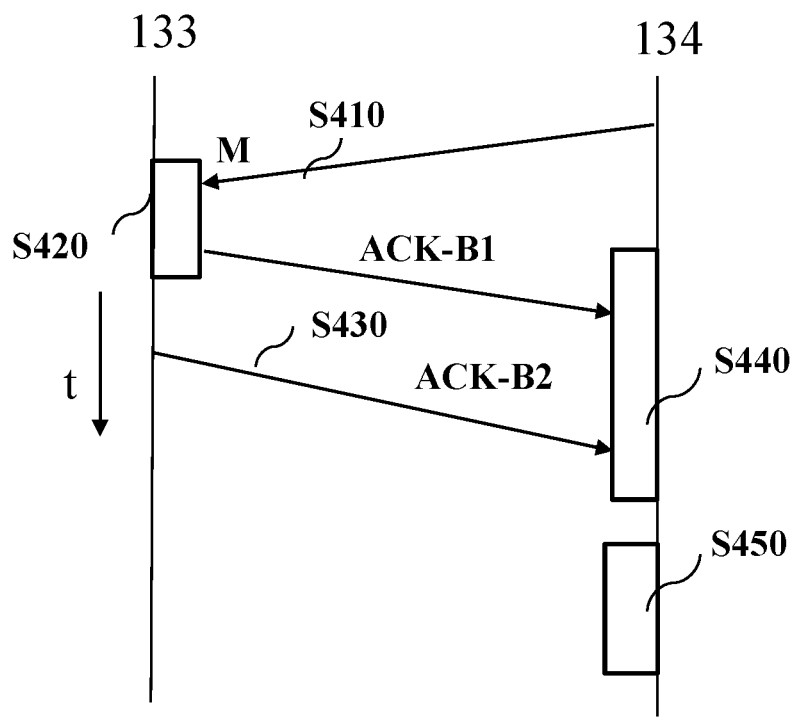
FIG. 4 illustrates schematically a method for transmitting a message or a frame in hyper-robust mode according to another particular embodiment.

FIG. 4 illustrates schematically a method for transmitting a message or frame in the HROBO mode according to a particular embodiment. The message M is transmitted by a source node device (for example the node device 134) to a destination node device belonging to its network neighbourhood (for example the node device 133). In this embodiment, the two node devices have multiband capacities and one, e.g. the node device 133, has decided to communicate in HROBO mode whereas the other, e.g. the node device 134, has decided to communicate in multiband by fragmentation mode using a modulation of the ROBO type on each band.

In a step S410, the node device 134 transmits the message M to the node device 133 on the first frequency band B1 in ROBO mode. In this particular example, the message M to be sent is short. There will in this case be no fragmentation and therefore only one band is used for transmitting the message M. In the case where the message M is long, it is fragmented and each fragment is then transmitted independently of the other fragments on frequency bands that may be different.

In a step S420, the node device 133 receives the message M on the band B1. It transmits an acknowledgement message ACK-B1 on the band B1 to the node device 134.

In a step S430, the node device 133 also transmits an acknowledgement message ACK-B2 to the node device 134 on the second frequency band B2. This is because the node device 133 is communicating in HROBO mode and therefore the acknowledgement messages are also duplicated. Sending two acknowledgement messages on different frequency bands enables the node device 133 to inform the node device 134 of its functioning in HROBO mode. This also makes it possible to increase the chances of reception of the acknowledgement message by the node device 134 in a disturbed environment to overcome potential interference.

In a step S440, the node device 134 receives two acknowledgement messages ACK-B1 and ACK-B2 on two different frequency bands and deduces that the node device 133 is communicating in HROBO mode.

In a step S550, the node device 134, having detected that the node device 133 is communicating in HROBO mode, changes its multiband by fragmentation transmission mode into HROBO mode.

It should be noted that the fact that the HROBO mode of the node device 133 is not detected by the node device 134, for example because only one of the two acknowledgement messages is received, does not prevent communication. This increases just the risk of packet loss (and therefore requiring repetitions) since as the environment is manifestly disturbed.

The embodiments are described in particular in relation to the G3-PLC and G3-PLC hybrid RF standard. However, they are not limited solely to this standard and could be applied to other standards, e.g. to the PRIME (standing for "PoweRline Intelligent Metering Evolution") specifications, that is to say in particular in a powerline communication network that does not have a mesh structure but which has a tree structure.

The embodiments are described in particular with a multiband by fragmentation transmission mode using a ROBO modulation in each band. However, in the embodiments described above, this transmission mode may be replaced by another multiband transmission mode that would be used in less disturbed environments, i.e. with moderate to high LQI values.

The embodiments described above are described with two frequency bands B1 and B2. They may be extended to the case of more than two frequency bands. They apply in general terms to the case of N frequency bands with N an integer greater than or equal to 2.

Figure 5:
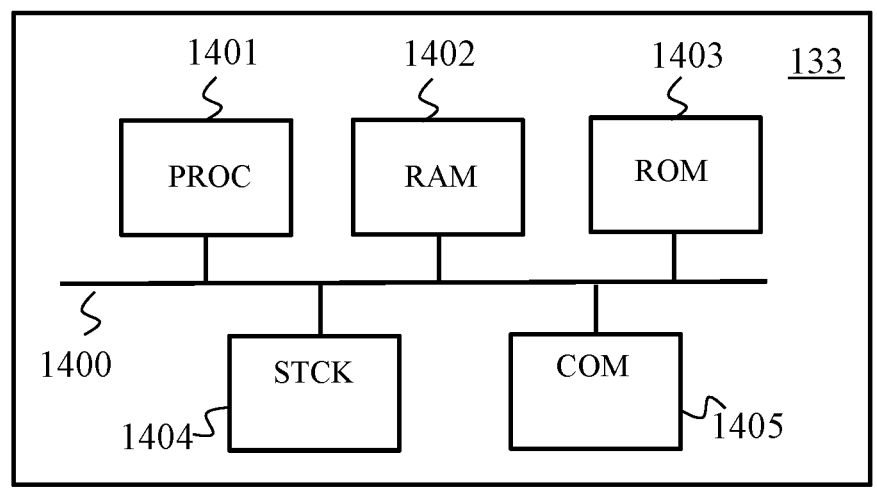
FIG. 5 illustrates schematically an example of hardware architecture of a node device of the mesh communication network according to one embodiment.

FIG. 5 illustrates schematically an example of hardware architecture of a node device 133 (and respectively 134) of the mesh communication network 120 according to one embodiment. Such a node device is termed multiband since it is capable of transmitting a message on a plurality of frequency bands. It should be noted that FIG. 5 could also illustrate schematically an example of hardware architecture of a processing module included in the node device.

According to the example of hardware architecture shown in FIG. 5, the node device 133 (and respectively 134) then comprises, connected by a communication bus 1400: a processor or CPU ("central processing unit") 1401; a random access memory RAM 1402; a read only memory ROM 1403; a storage unit such as a hard disk (or a storage medium reader, such as a SD ("Secure Digital") card 1404; at least one communication interface 1405 enabling the node device 133 (and respectively 134) to communicate with the node devices belonging to its network neighbourhood, e.g. the node device 134 (and respectively 133).

The processor 1401 is capable of executing instructions loaded in the RAM 1402 from the ROM 1403, from an external memory (not shown), from a storage medium (such as an SD card), or from a communication network. When the node device is powered up, the processor 1401 is capable of reading instructions from the RAM 1402 and executing them. These instructions form a computer program causing the implementation, by the processor 1401, of all or some of the methods described in relation to FIGS. 2, 3 and 4.

The methods described in relation to FIGS. 2, 3 and 4 can be implemented in software form by executing a set of instructions by a programmable machine, for example a DSP ("digital signal processor") or a microcontroller, or be implemented in hardware form by a machine or a dedicated component, for example an FPGA ("field-programmable gate array") or an ASIC ("application-specific integrated circuit"). In general, the node device 133 (or respectively 134) comprises electronic circuitry configured to implement the methods described in relation to FIGS. 2, 3 and 4.

The invention claimed is:

1. A transmission method for transmitting a message from a first node device to a second node device belonging to a network neighbourhood of said first node device, said first and second node devices belonging to an electrical supply network using powerline and/or radio-frequency communications, the transmission method in a so-called hyper-robust mode comprising:
   transmitting, by said first node device, said message, to said second node device, on a first frequency band of a set of frequency bands comprising at least two frequency bands, said message being modulated according to a robust mode, a modulation according to said robust mode comprising successively a Reed-Solomon coding, a convolutional coding, a coding by code repetition and a BPSK modulation; and
   transmitting, by said first node device, said message, to said second node device, on at least one second frequency band of said set of frequency bands, said message being modulated according to said robust mode and said first and second frequency bands being different;
   and further comprising the following steps performed by said second node device:
   receiving said message on said first frequency band and on said second frequency band;
   deducing therefrom that the first node device is configured according to the hyper-robust mode;
   changing its own transmission mode into the hyper-robust mode in the case where its own transmission mode is different from said hyper-robust mode;
   transmitting, to said first node device, an acknowledgement message on said first frequency band and an acknowledgement message on said second frequency band.

2. The transmission method according to claim 1, wherein deducing therefrom that the first node device is configured according to the hyper-robust transmission mode comprises deducing therefrom that the first node device is configured according to the hyper-robust transmission mode when said second message is received before the end of a time window of predefined length commencing with the reception of said message on said first time band.

3. The method according to claim 1, wherein said first node device, on receiving a message coming from said second node device on one of said first and second frequency bands, returns an acknowledgement message on said first frequency band and an acknowledgement message on said second frequency band, and said second node device, receiving an acknowledgement message on said two frequency bands, deduces therefrom that the first node device is configured according to the hyper-robust transmission mode and changes its own transmission mode into hyper-robust mode in the case where its own transmission mode is different from said hyper-robust mode.

4. The method according to claim 1, wherein said first node device considers that said message has been correctly received by said second node device in the case where at least one acknowledgement message is received by said first device on at least one of said first and second frequency bands.

5. The method according to claim 1, wherein said set of frequency bands comprises:
   the CENELEC A frequency band;
   the CENELEC B frequency band;
   the FCC frequency band or the ARIB frequency band; and
   the RF channel of G3-PLC hybrid RF.

6. A non-transitory storage medium storing instructions for implementing, by a node device, the method according to claim 1, when said instructions are executed by a processor of the node device.

7. An electrical supply network using powerline and/or radio-frequency communications, said network comprising at least one first node device configured for transmitting a message according to a so-called hyper-robust mode to a second node device of said network belonging to its network neighbourhood, said first node device comprising at least one processor configured to:
   transmit said message to said second node device on a first frequency band of a set of frequency bands comprising at least two frequency bands, said message being modulated according to a robust mode, a modulation according to said robust mode comprising successively a Reed-Solomon coding, a convolutional coding, a coding by code repetition and a BPSK modulation; and
   transmit said message, to said second node device, on at least one second frequency band of said set of frequency bands, said message being modulated according to said robust mode and said first and second frequency bands being different;
   and said second node device comprising at least one processor configured to:
   receive said message on said first frequency band and on said second frequency band;
   deduce therefrom that the first node device is configured according to the hyper-robust mode;
   change its own transmission mode into the hyper-robust mode in the case where its own transmission mode is different from the hyper-robust mode;
   transmit, to said node device, an acknowledgement message on said first frequency band and an acknowledgement message on said second frequency band.

* * * * *